United States Patent [19]
Cantini

[11] 4,258,459
[45] Mar. 31, 1981

[54] MACHINE FOR AUTOMATICALLY PREPARING AND INTRODUCING CLOSURE SLIDERS INSIDE ANNULAR HOLLOW MEMBERS FOR PRODUCING ANNULAR SPRING SAFETY CATCHES FOR NECKLACES, BRACELETS AND THE LIKE

[75] Inventor: Alfredo Cantini, Arezzo, Italy
[73] Assignee: Gori & Zucchi S.p.A., Italy
[21] Appl. No.: 18,284
[22] Filed: Mar. 6, 1979

Related U.S. Application Data

[63] Continuation-in-part of Ser. No. 841,339, Oct. 12, 1977, abandoned.

[51] Int. Cl.³ .............................................. B23P 23/00
[52] U.S. Cl. ..................................... 29/33 J; 29/33 K; 29/36; 29/160.6; 29/564.2
[58] Field of Search ............. 29/33 J, 33 K, 36, 160.6, 29/564.1, 564.2, 564.7, 564.8, 56.6

[56] References Cited
U.S. PATENT DOCUMENTS
1,856,952  5/1932  Foerster ............................. 29/160.6
4,077,099  3/1978  Cantini ........................... 29/160.6 X

*Primary Examiner*—Z. R. Bilinsky
*Attorney, Agent, or Firm*—Holman & Stern

[57] ABSTRACT

A machine for preparing and introducing closure sliders inside annular hollow members for producing spring safety catches for necklaces and the like, consisting of two operative unitsets, each comprising a table rotatably mounted about a vertical axis and actuated by means for rotating the table intermittently through angles of 90° and carrying four radially reciprocating pliers units spaced apart from each other of 90° and associated with four units positioned around the respective revolving table at each of the stop positions thereof, the first unit set comprising: a unit for ordinately supplying the sliders; a unit for cutting each slider in the desired size; a unit for bevelling one end of each slider; and a unit for partially introducing the bevelled end of the slider inside the cavity of a respective annular member provided with a longitudinal slot fed by the second unit set which comprises a unit for ordinately supplying said annular hollow members; a unit for supporting the annular member so as to be able to receive the partial introduction of the slider, a unit for performing a further partial insertion of the slider inside the annular member; and a unit for completing the insertion of the slider into the annular member, means being also provided for moving and stopping the devices of the machine, according to a predetermined time sequence.

8 Claims, 22 Drawing Figures

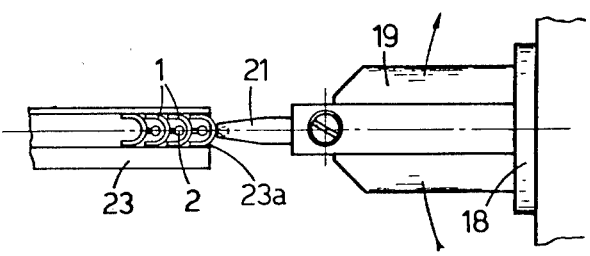
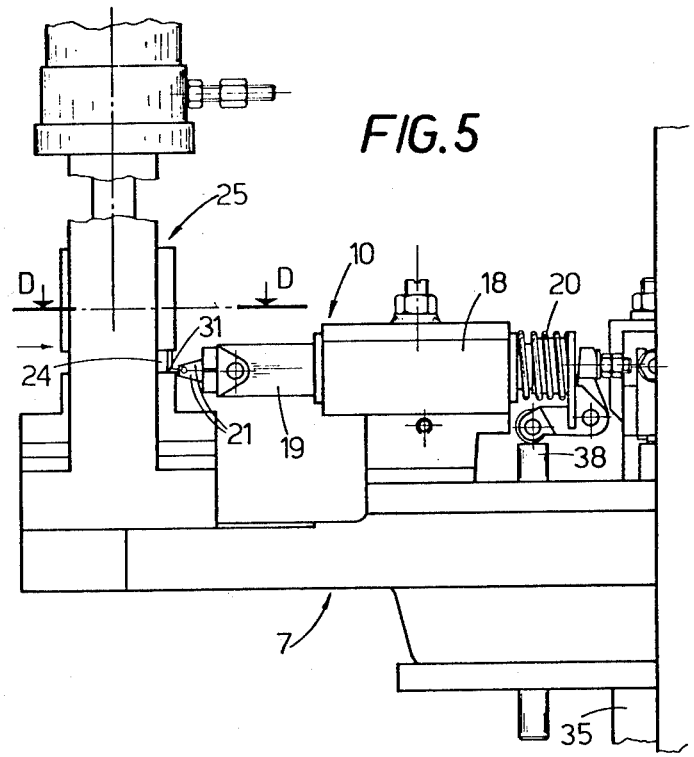
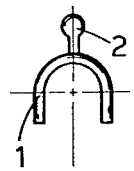
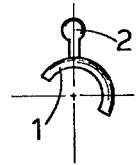
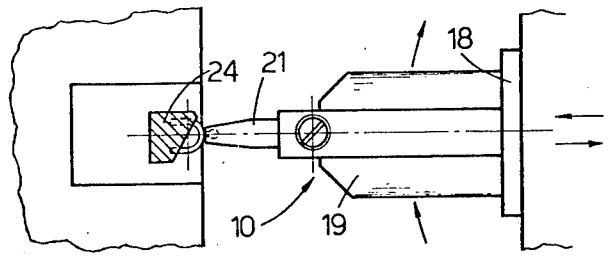

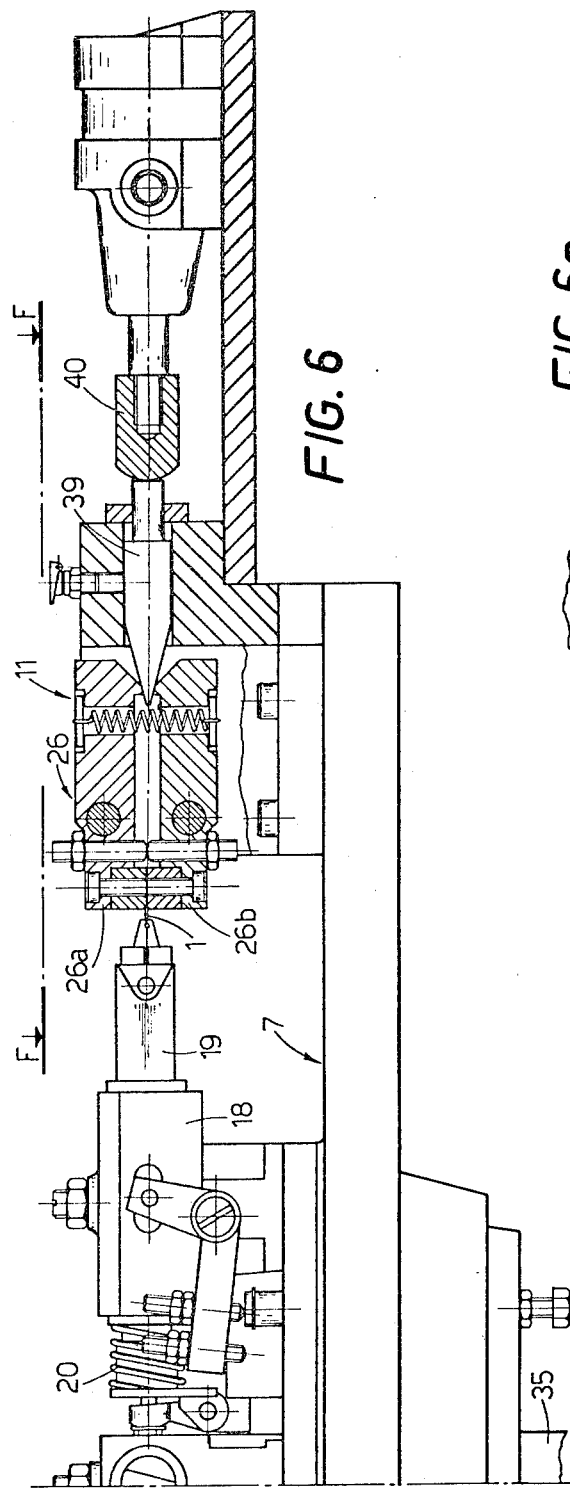
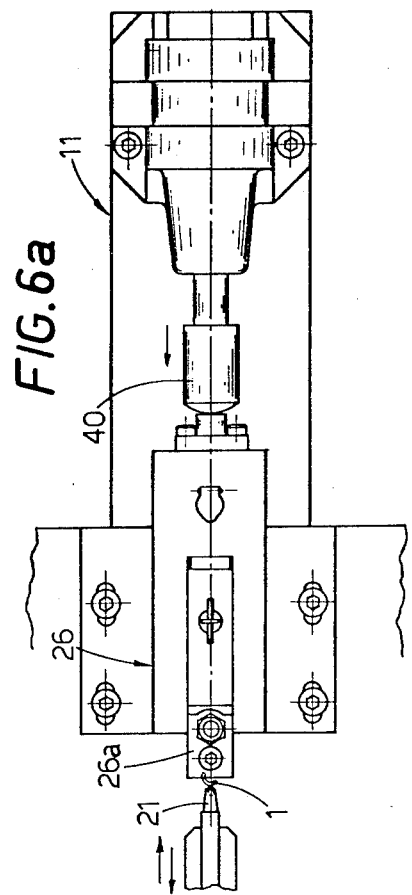
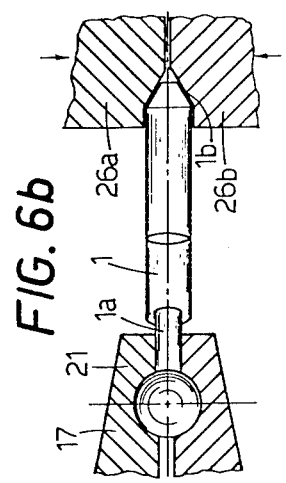

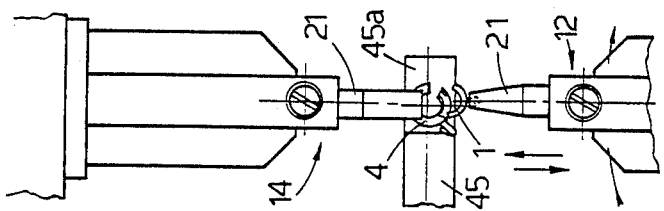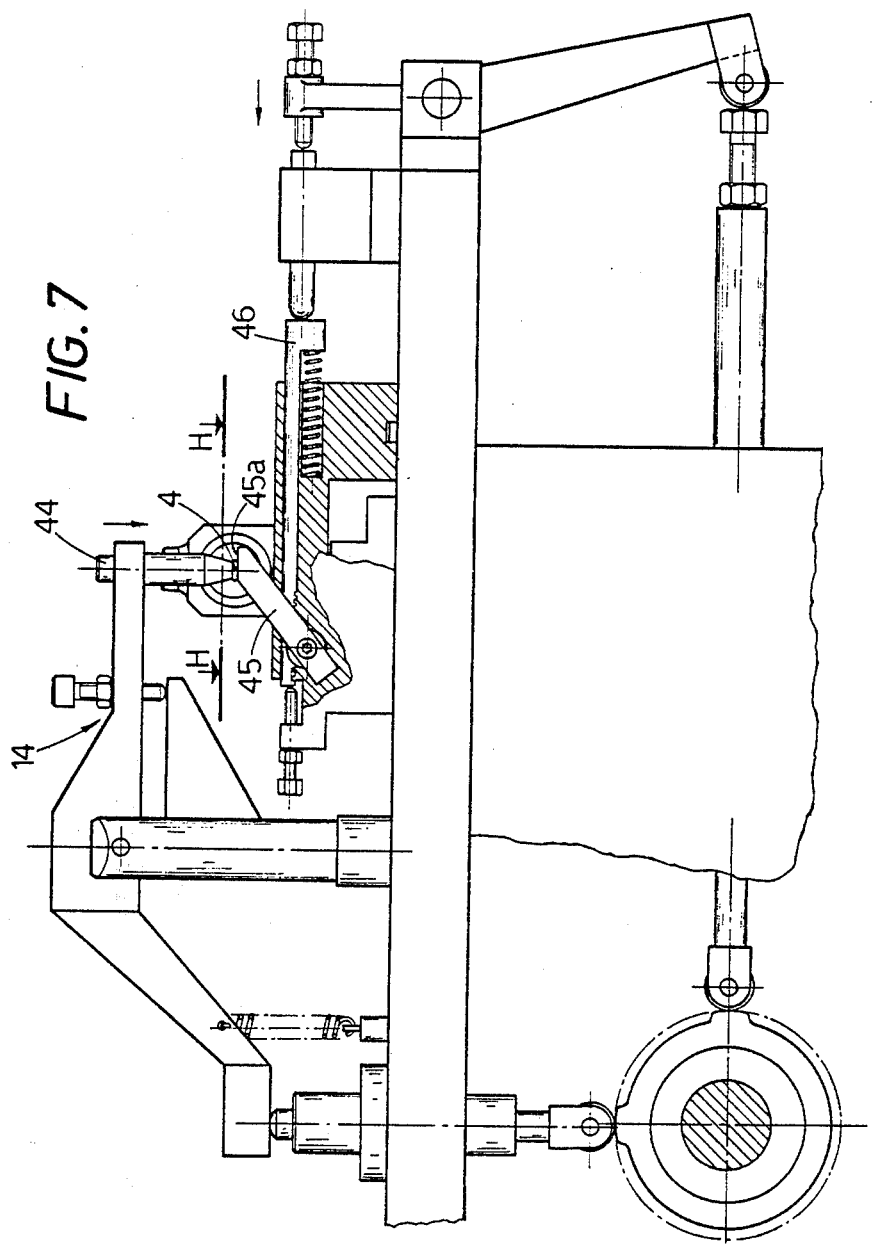

MACHINE FOR AUTOMATICALLY PREPARING AND INTRODUCING CLOSURE SLIDERS INSIDE ANNULAR HOLLOW MEMBERS FOR PRODUCING ANNULAR SPRING SAFETY CATCHES FOR NECKLACES, BRACELETS AND THE LIKE

This application is a continuation-in-part of prior application Ser. No. 841,339, filed Oct. 12, 1977 and now abandoned.

The present invention relates to a machine for automatically preparing and introducing arcuated closure sliders inside annular hollow members, which will be subsequently provided with inner helical springs by another machine, so as to obtain the conventional safety annular catches which serve as safety closure means of necklaces, bracelets and the like.

The safety catches have been obtained hitherto by manual operative methods, and more recently according to semiautomatic operative methods.

The machine of the invention comprises two revolving tables, each rotatably mounted about a vertical axis and co-operating with means to cause said table to intermittently rotate, step-by-step, through angles of 90° and to stop during predetermined time intervals. Around and near the periphery of each revolving tables four sets of support and guiding means, are mounted which are angularly space apart from each other of 90°, each of them comprising a radially reciprocating sliding body, carrying a pliers unit, each pliers unit including two vertically superposed pliers arms controlled by means causing the closing and the opening of said pliers arms according to a predetermined time sequence, each sliving body being associated with means to move the sliding body to and from in radial direction at and during predetermined time intervals up to bring said pliers arms beyond the peripheral edge of the respective revolving table, around which table and at each of stop positions thereof in the rotation direction being provided: a first unit including means for ordinately supplying the arcuated closure sliders in a predetermined disposition thereof; a second unit for cutting each closure slider in the desired shape; a third unit comprising means for bevelling the trailing end of each closure slider; and a fourth unit including means to urge the bevelled end of a slider to enter the annular hollow member, passing through the longitudinal slot conventionally arranged at the outer side thereof, the annular member being supported and approached to the fourth unit by the pliers arms of one of the four pliers units mounted on the second revolving table. The second operative unit set comprises; a first unit for supplying, one by one, and in a predetermined position, the annular hollow members designed to compose the annular safety catches; a second unit adjacent and aligned with the fourth unit of the first operative unit set, this second unit including means for supporting an annular hollow member during the first introduction step of the bevelled end of the respective slider through the longitudinal slot of the respective annular hollow member; a third unit for performing a further partial introduction of the slider inside the inner cavity of the respective annular hollow member; and a fourth unit for completing the introduction of the closure slider inside the annular hollow member and for conveying the so obtained safety catch which is yet lacking of spring towards the following machine designed to introduce a helical spring inside said catch, means being provided for controlling the operation and for stopping the various devices and means and of this machine, according to a predetermined time sequence and correlation.

The machine of this invention performs all the aforementioned operative steps in a fully automatic manner, so that the output per hour of this machine is very improved and perfect products are obtained.

Other characteristics and advantages of the present invention will be better understood from the following description of an embodiment of this invention, taken in consideration together with the accompanying drawings, in which:

FIGS. 1a and 1b, as viewed together, show a diagrammatic top view of the machine, said view having been separated in two halves in order to enable to use an enlarged scale for the better understanding of the details of this machine;

FIG. 2 shows, in a very enlarged scale, a top view of the closure sliding mounted inside an annular hollow member which has been horizontally sectioned and which is designed to form a spring safety catch but which is yet without the helical spring provided to urge the slider in its closure position;

FIG. 3 the vertical partial section of one of the halves of one of the two revolving tables in a vertical section taken on the line A—A of FIGS. 1a and 1b and the other half in a partly sectioned side view;

FIG. 4 shows the view of the unit provided to feed ordinately the sliders, taken on the line B—B of FIG. 1a;

FIG. 4a is a top view in enlarged scale of a detail encircled in FIG. 4;

FIG. 5 shows of enlarged scale the view of the unit for cutting the sliders, taken on the line C—C of FIG. 1a;

FIG. 5a shows the top view (taken from the line D—D of FIG. 5), of a detail of this FIG. 5;

FIGS. 5b and 5c show the slider before (FIG. 5b) and after (FIG. 5c) the cutting operation;

FIG. 6 shows the view, taken on the line E—E of FIG. 1a, of the unit designed to perform the bevelling of one slider end;

FIG. 6a is the top view of the bevelling unit, taken on the line F—F of FIG. 6;

FIG. 6b shows in enlarged scale a part of the bevelling unit of FIG. 6, the operative means, acting on the slider, being partially sectioned;

FIG. 7 is the view of the unit for fitting a slider into the hollow annular member orifice, taken on the line G—G of FIG. 1a;

FIG. 7a is the view of a detail of FIG. 10 taken on the line H—H of FIG. 10;

Figure 2:
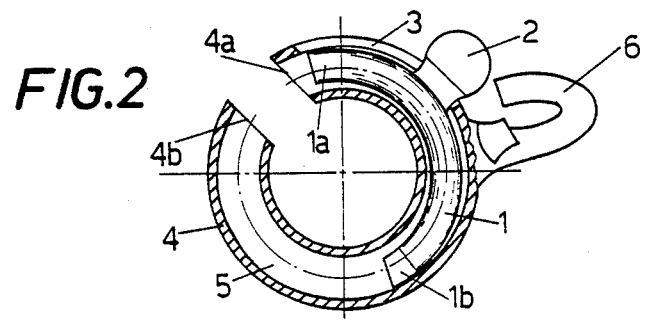

Now referring to the FIG. 2 at 1 is indicated a closure slider provided with a side small gripping knob or tooth 2 designed to radially extend out of a longitudinal slot 3 arranged on an outer side portion of an annular hollow member constituted of a partial hollow ring 4 from which has been cut away a sector so as to form a hollow member 4 open at both ends, and having an outlet orifice 4a and an inlet orifice 4b for the leading end 1a of said slider 1, while the opposite end or trailing end 1b of said slider 1 has a bevelled portion at its upper and lower parts, these features being well known in the art.

At 5 is indicated the inner annular cavity of the hollow member 4 which is made integral with a small open link 6 for connecting said safety catch with a necklace, bracelet and the like. The slider 1, and the annular hollow member 4 have been mentioned and illustrated only to make the following description more easily intelligible.

The machine of the invention (FIGS. 1a and 1b) consists of two operative unit sets each comprising a revolving table, generally marked 7 and 8, respectively each co-operating with four stationary working units, generally indicated 9, 10, 11, 12 and 13, 14, 15, 16 respectively, said units being positioned around the periphery of the respective revolving table 7 or 8 and are angularly spaced apart of 90° from each other. The revolving table 7 in combination with the stationary units 9, 10 and 11 co-operating therewith is designed to perform subsequently the steps of conveying and supplying the sliders 1, and the cutting and shaping thereof. At the position in which there are the stationary units 12 and 14 takes place the transfer of each slider 1 from the first operative unit set which includes the revolving table 7, and the second one including the revolving table 8, in the units 13, 15 and 16 of which the subsequent steps are performed which are necessary for inserting each slider inside of a respective annular member 4.

The revolving tables 7 and 8 are operatively similar to one another and have a similar structure and devices co-operating therewith so that the same references are used for indicating the operatively identical means and devices.

Figure 1A:
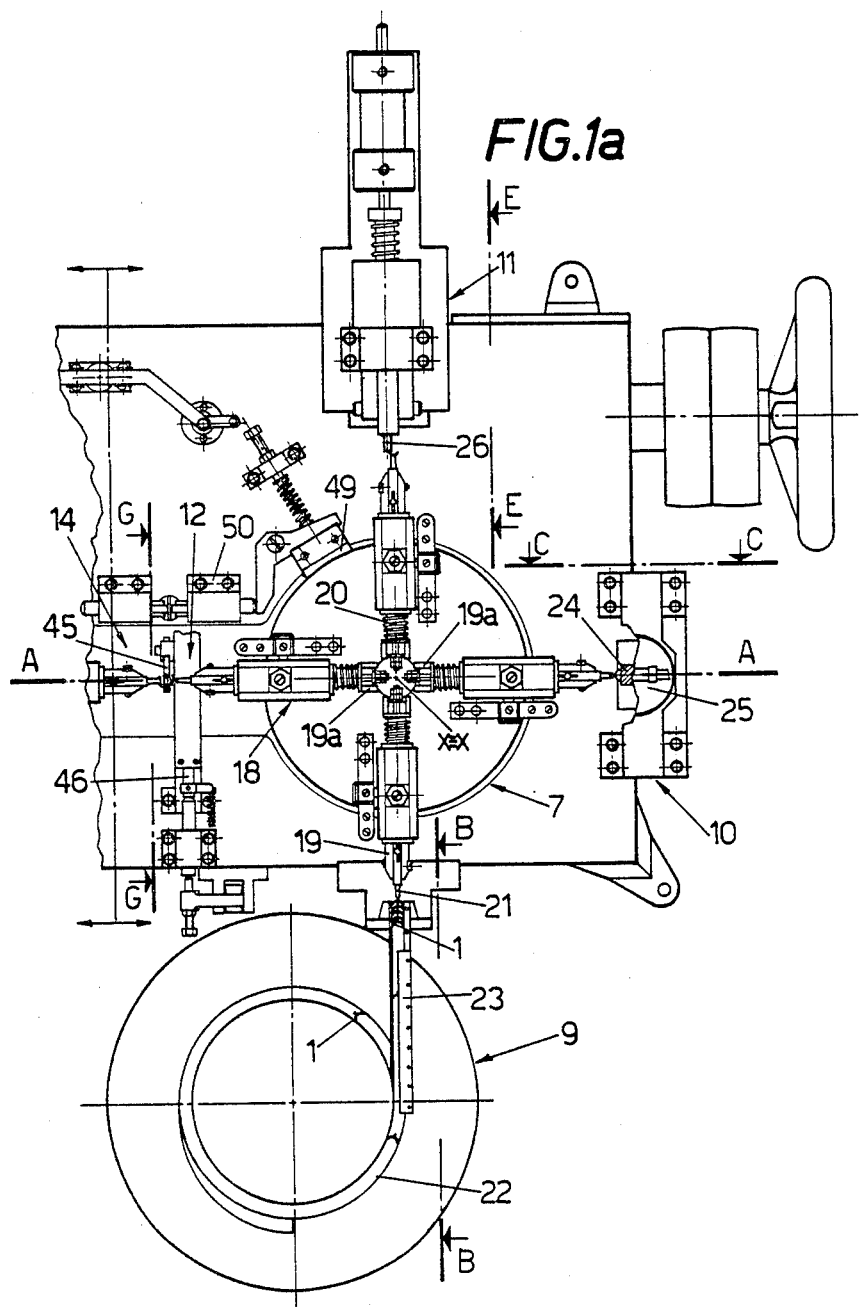
Figure 1B:
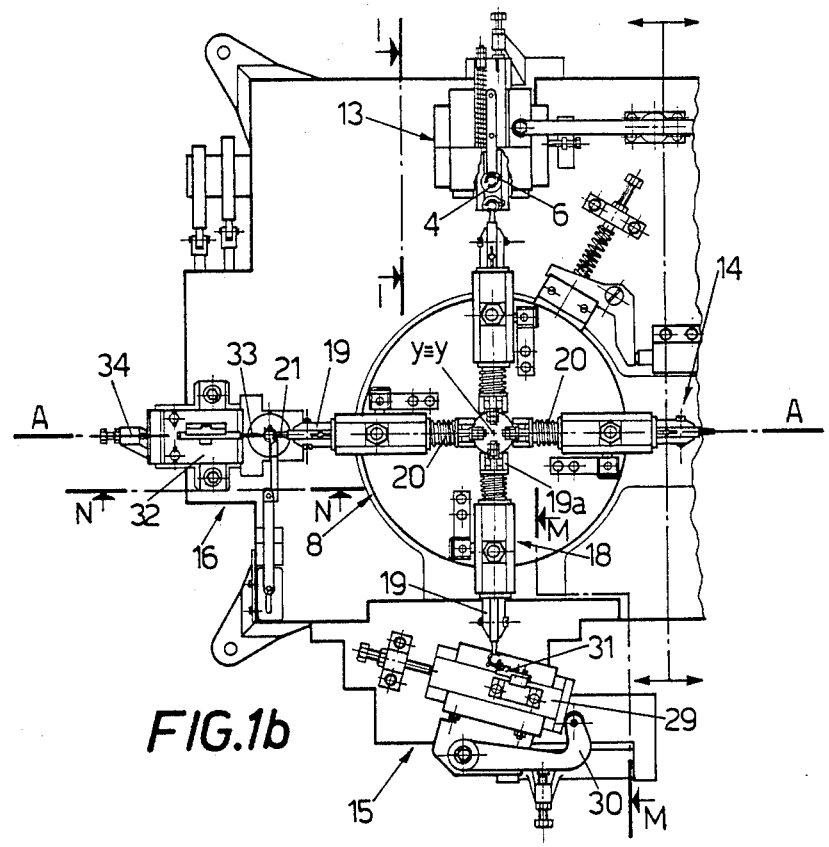
Figure 3:
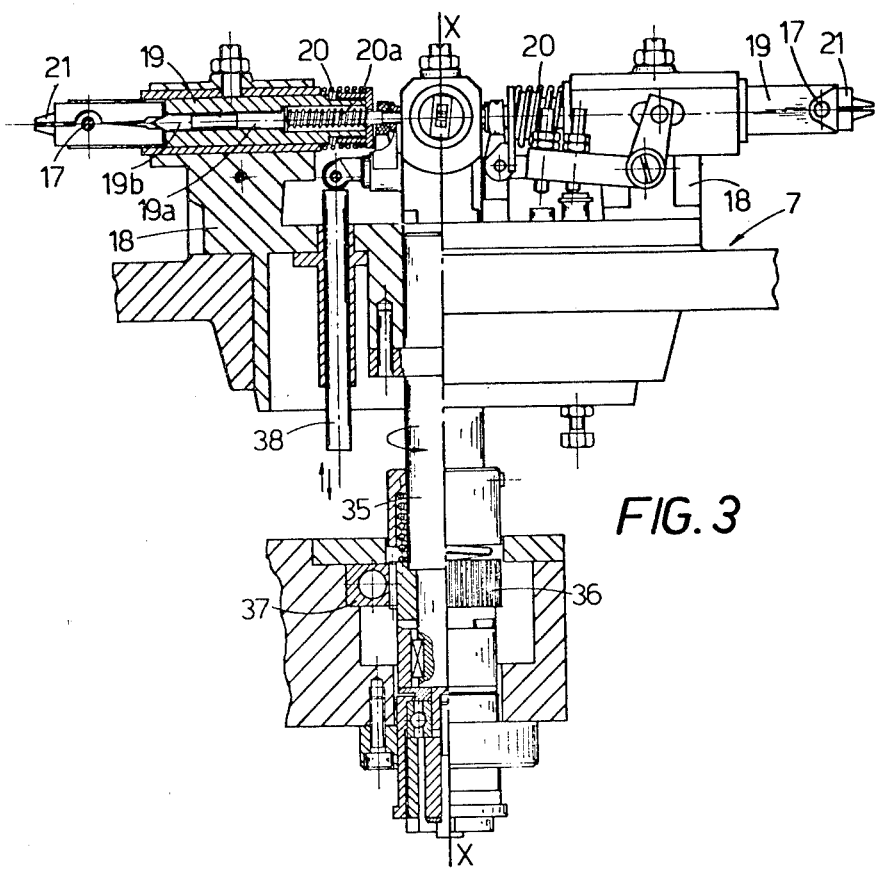
Figure 4:
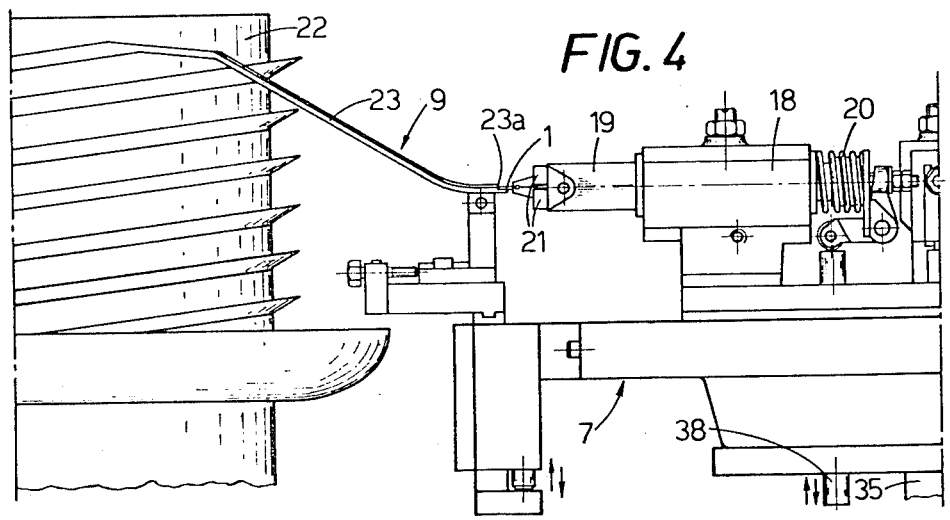

The revolving tables 7 and 8 are pivotally mounted for rotation in the directions of the arrows in FIGS. 1a and 1b, about the vertical axes X—X and Y—Y respectively, on supporting shafts 35, each shaft 35 being intermittently driven by a control system including a pinion 36 and a worn screw 37 controlled by a cam (not shown) so that each revolving table 7 and 8 rotates (step-by-step) through an a angle of 90°, stopping just in the front of one of the stations of the units co-operating with the respective revolving table 7 or 8 during a predetermined time interval, owing to a suitable shaping of said cam. FIG. 3 shows the first table 7. On the each revolving table 7 or 8 are mounted, near the periphery thereof, four identical supporting radial tubular guideways body 18 are mounted, along each of which a hollow shaft 19 can reciprocate, slidably carrying an inner rod 19a having a cam follower at its inner end, which engages a control cam (not shown). Each sliding shaft 19 is associated with a return damping spring 20 and the inner rod 19a is associated with an inner return spring 20a. The outer end of each sliding body 19 carries a pair of vertically superposed pliers arms 21 pivotally mounted on the transverse pivot pin 17 and co-operating with springs (not shown) designed to return said arms 21 in their open position. A wedge end 19b of the control rod 19a, when pushed outwards by its control device 38 causes the pliers arms 21 to approach each other so as to grip any interposed piece, which, in the present case, and with reference to the revolving table 7 will be a slider 1, while with reference to the revolving table 8 will be an annular hollow partial member 4. The pliers 21 can be moved outwardly so as to extend radially beyond the peripheral edge of the respective revolving table 7 of 8. The first unit 9 of the unit set associated to the table 7 comprises an annular container 22 for the sliders 1 (FIGS. 4 and 4a) which is kept in vibration by suitable means; near the bottom of said container 22 an outlet channel 23 extends from said container downwards and is provided to deliver the sliders 1, the channel 23 having a cross section adapted to allow that the sliders 1 can enter said conduit in substantially horizontal position and according to a correct alignment, one after the other, with their knobs or teeth 2 projecting in their front (FIG. 4a). The first slider 1 of the sliders aligned inside the delivery conduit 23 is hold under a light friction inside the delivery orifice 23a from which only its knob 2 extends outwardly. When a pliers support 18 stops in the front of the unit 9, the control means 38 causes the sliding shaft 19 and the wedge rod 19a to move forwards and causes the pliers arms 21 to open until at the end of this stroke the pliers arms will be positioned over and below the knob 2 respectively; then said pliers arms 21 are caused to approach each other by the relative forward movement of the control rod 19a so that they firmly grip said knob 2 there between. Afterwards the sliding shaft 19 is brought back always supporting the pliers with their pliers arms 21 in their closed condition; then the revolving table 7 begins to rotate again through a further angle of 90°.

When this pliers support 18, coming from the stop position facing the unit 9 arrives in the front of the unit 10, (FIGS. 5, 5a) respective pliers arms 21 are caused to move outwardly up to bring the ends of the slider 1 into contact with a counterwall 24 having an adjustable position and which is a part of a shearing device 25 designed to cut the ends of the original slider 1 shown in (FIG. 5b) so that this latter be cut to the desired shape (FIG. 5c). When the pliers 21 together with their supporting sliding body 19 are brought back and the revolving table 7 begins again to rotate up to bring the pliers 21 together with the duly cut slider 1 supported by them, to stop just in the front of the unit 11 (FIGS. 6, 6a and 6b), in which position the pliers 21 are caused to move forwards up to bring that of the two ends of the slider 1, which will constitute the trailing end 1b of the slider 1 (FIG. 2) between the shaping member 26a, 26b of a shaping device 26 which by means of a light flattening action on the trailing slider end creates a light bevelling 1b on the upper and on the lower portion of said end of said slider 1. The bevelling device 26 is controlled through a wedge body 39 by a piston 40.

Then the revolving table 7 rotates again through a still further angle of 90° so as to bring the finished slider 1 in the front of the unit 12. After the table 7 stops, the pliers 21 are caused to move forwards so as to co-operate to perform the first step of the introduction of end 1b of the slider 1 through the slot 3 inside the annular partial hollow member 4, which the revolving table 8 has carried at the same time in the front of the unit 14. Afterwards the pliers arms 21 mounted on the table 7 are caused to open so as to release their gripping on the slider 1 which is now carried by the hollow member 4 being partially introduced inside this latter, while this pliers unit of the first operative unit set begins a new operative cycle. At the same time the other three pliers 21 of the revolving table 7 perform respectively the same aforementioned operations on other sliders 1 but with a dephasing of a fourth of a cycle from each other.

Figure 8:
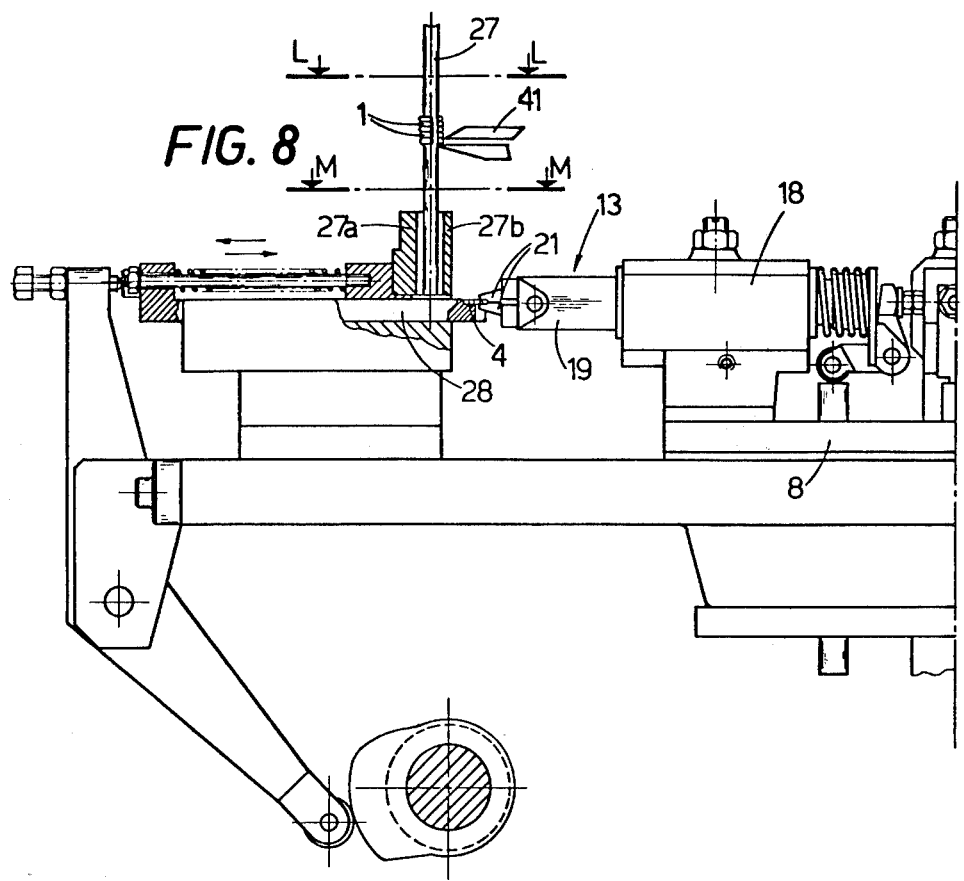
FIG. 8 is a partially sectioned view of the pliers unit facing the unit, in which are fed the annular hollow members for obtaining the spring safety catches, said view being taken on the line I—I of FIG. 1b.
Figure 10:
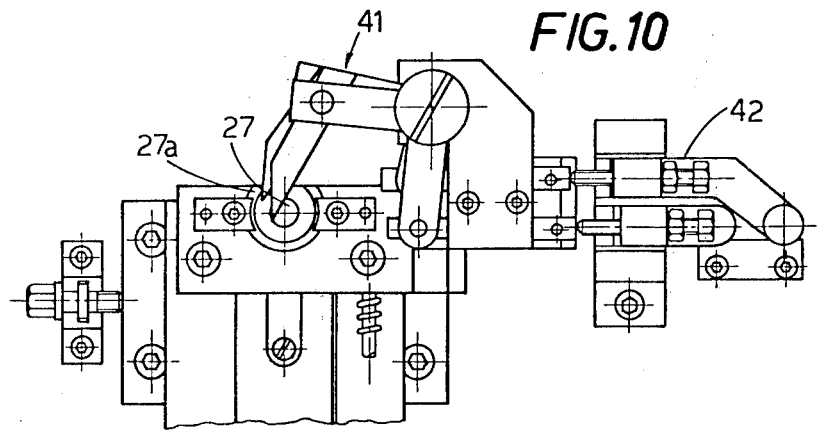
FIG. 10 is a top view of a detail of the device provided for distributing, one by one, the annular members, said view being taken on the line L—L of FIG. 8.
Figure 9:
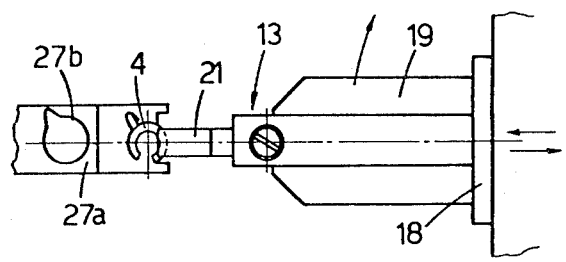
FIG. 9 is a top view of a detail of the unit of FIG. 8, taken on the line K—K thereof.

The operative cycle of the second operative set comprising the revolving table 8 and the units 13 to 16 will be now described. In this operative set each operative cycle begins in the station where there is the unit 13 (FIGS. 8 to 10) which is provided with a vertical guiding rod 27 entering into a container 27a including a vertical tubular chamber 27b, into which can be received the annular hollow members 4 in column and so positioned that their open portions are vertically aligned so as to present in the front of the discharge orifice, which faces the revolving table 8 and is arranged near the bottom of said container, the side portion of said annular member 4 opposite to that where the slot 3 is arranged. At 28 is indicated a sliding distributor, which enters the lowermost part of the container 27a so as to be able to push forwards towards the revolving table 8 the annular member 4 of the column of annular members 4 collected inside the container 27a mounted around the guiding rod 27 and which has let fall down by the selector 41, which is able to let free in turn only the lowermost annular member of the series of annular members 4 mounted on the rod 27, as a pliers unit arrives in the front of the unit 13, under the control of control means 42 (FIG. 10). Thus the distributor 28 can move forwards in turn only one annular member 4, up to position it between the open pliers arms 21 of the pliers unit 21 which has been stopped in the front of said container 27a without allowing the position of said annular member 4 to be varied, the pliers unit after the stopping of the table 8 being caused to advance up to bring their pliers arms 21 about that portion of the annular member 4 which faces the revolving table 8 so that when the pliers arms 21 approach each other they can grip firmly there between the annular member 4 in such a manner that the side portion of this latter, along which there is the longitudinal 3, is positioned externally in regard to the table 8 and becomes free accessible. Then the pliers 21 together with their supporting sliding shaft 19 are brought back to their starting position while the revolving table 8 rotates up to attain the unit 14, in the front of which it stops.

Figure 12:
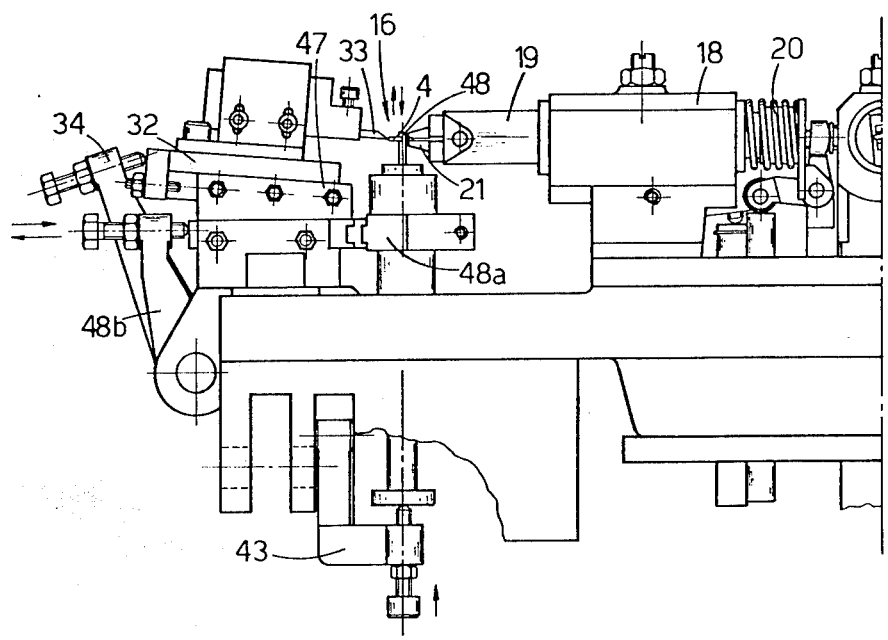
FIG. 12 is the view taken on the line N—N of FIG. 1b of the unit for completing the insertion of the slider inside the annular hollow member and for the punching thereof.
Figure 12A:
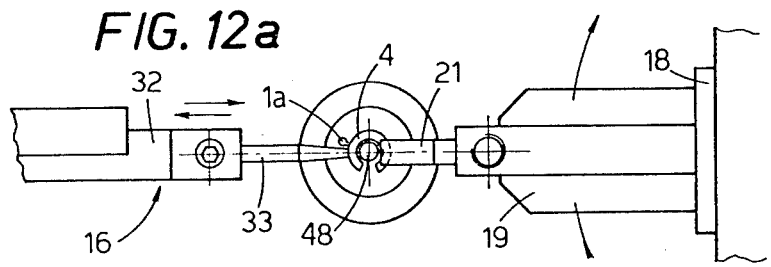
FIG. 12a is the top view of a detail of FIG. 12.
Figure 11:
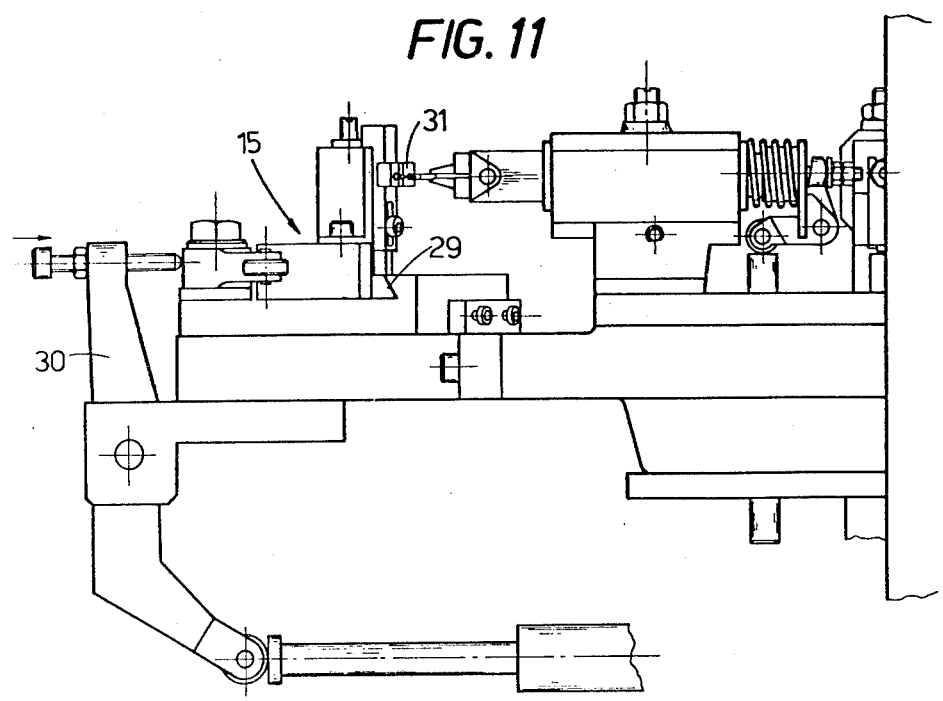
FIG. 11 is the view, taken on the line M—M of FIG. 1b, of the unit for the insertion of the slider in the inside of the annular member which will subsequently house also a helical spring.
Figure 11A:
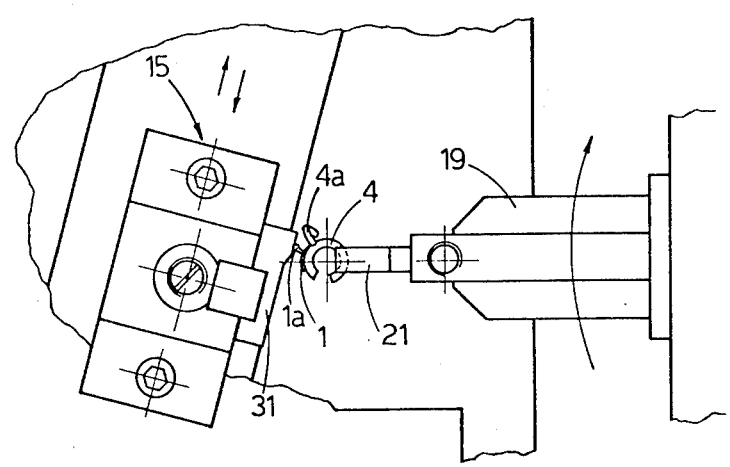
FIG. 11a is a top view of a detail of FIG. 11.

In this position the pliers 21 carrying the finished slider 1 and which are now placed in the front of the station 12 of the first operative unit set and those carrying the annular member 4 on the unit 14 of the second operative unit set are now aligned one with the other (FIGS. 7 and 7a); then the respective pliers 21 are caused to approach each other up to allow the trailing end 1b of the slider 1 to enter the slot 3 and to be partially introduced inside the cavity 5 of the facing member 4, while at the same time a sliding body 45 (FIG. 7) having a supporting counterwall 45a and controlled by a rack mechanism 46 moves forwards so as to support the sides of the annular member 4 operating in combination with a punch device 44. Thence the pliers arms of the pliers 21 mounted on the revolving table 7 are caused to open thus realising the gripping on the slider 1 and are caused to move backwards, while the pliers 21 of the revolving plate 8, which now carry the annular member 4, inside which the slider 1 has been partially introduced move backwards without allowing the pliers arms to open. The revolving table 8 begins now to perform a further rotation through an angle of 90° so as to bring the pliers unit 21 carrying the annular member 4 with the partially inserted slider 1 in the front of the unit 15 (FIGS. 11 and 11a), where is provided a slide 29 controlled by a rocking lever 30, the slide 29 carrying a tool 31 so shaped that it can encounter the slider 1 and imparts to this latter a rotary movement in order to cause said slider 1 to furtherly enter partially inside the inner cavity 5 of the annular member 4. At last the revolving table 8 begins again to rotate so as to bring said annular member 4 together with the slider 1, yet partially introduced inside the annular member 4, in the front of the unit 16 (FIGS. 12 and 12a) where is mounted a slide 32, slidably mounted along radial guideways 47 in regard to the revolving table 8, the slide 32 carrying a pusher 33 which, when it is caused to advance together with the slide 32 under the action of the rocking lever 34, completes the introduction of the slider 1 inside the hollow annular hollow member 4 which abuts on a vertical counteraction pin 48, supported by a slider 48a controlled by the rocking lever 48b. The pin 48 can be moved upwards by a rocking lever 43. Then the pin 48 lowers and arms of this pliers unit 21 mounted on the revolving table 8 open and are brought back allowing the annular member 4 having the slider 1 correctly therein to fall down on a discharge plans or other collecting means (not shown) for the finished catches which will be thence conveyed towards another known machine for the automatic introduction of the respective helical spring, said further details being not shown in the drawings. Each of the revolving tables 7 and 8 are associated with a brake mechanism 49 controlled by a control device 50 (FIGS. 1a, 1b) adapted to stop lach revolving table 7 or 8 just in the front of the respective operative units.

What we claim is:

1. A machine for preparing and introducing arcuated closure sliders inside hollow annular members for producing spring safety catches for necklaces, bracelets and the like characterized by the fact that it consists of two operative unit sets, each comprising a revolving table pivotally mounted for movement about a vertical axis and associated with means to cause said table to rotate at predetermined time intervals through angles of 90° about this axis, each table carrying, around and near its peripheral edge, four sets of support and guiding means, angularly spaced apart from each other and comprising a sliding body carrying a pliers unit and controlled by means for reciprocating the sliding body along a radial path, the pliers including two vertically superposed pliers arms controlled by means for closing and opening the pliers arms according to a predetermined time sequence and during predetermined time intervals for moving the pliers outwards up to project beyond the peripheral edge of the respective revolving table or for returning the pliers in their starting positions, about the first revolving table at each of its stop positions and in the rotation direction thereof being positioned and co-operatively associated: a first unit, including means for ordinately supplying each closure slider in a predetermined disposition; a second unit comprising a device for cutting each closure slider in a predetermined form; a third unit including a device for bevelling the trailing end of each closure; and a fourth unit including devices for pushing the bevelled end of each slider to enter in the inner cavity of a respective annular hollow member provided with a longitudinal slot at its outer side and which is approached by the pliers arms of one of the four pliers sets mounted on the second revolving plate, about which are placed four units, placed in the front of the positions in which the second revolving plate stops, the second unit set comprising; a first unit where an apparatus is provided for supplying one by one in a predetermined disposition one annular hollow member designed to form an annular safety catch; a second unit adjacent and arranged in line with the fourth unit associated with the first revolving table and provided with means for supporting said hollow member during the partial introduction of the closure slider to be introduced therein, passing through the longitudinal slot thereof; a third unit including means for performing a further partial insertion of the closure slides into the inner annular cavity of the respective annular hollow member; and a fourth unit provided with means for completing the insertion of the closure slider inside the annular hollow member and to discharge the so obtained safety catch which is yet without spring, means being provided for controlling and stopping the various devices and means of the machine, according to predetermined time sequence and correlation.

2. A machine according to claim 1, wherein the first unit of the operative unit set comprises an annular container for the sliders, aligned in a line one after the other and kept in vibration by suitable means, near the bottom of which an inclined downwardly delivery channel member is formed provided with guiding means for conveyning the sliders ordinately one by one, in a substantially horizontal position and with their control knobs or side teeth facing the revolving table supplied from this first operative unit.

3. A machine according to claim 1, wherein in the second unit associated with the first revolving table a counterwall is provided having an adjustable position and against which abut the slider ends, while a shearing device is also mounted, adapted to cut the slider end portions to the desired lengths.

4. A machine according to claim 1, wherein the third unit of the first operative unit set comprises a shaping device adapted to bevel the upper and lower end portion of each slider end, opposite to its leading end so as to flatten this end in order to make easier the introduction of said slider inside the annular member through the longitudinal side slot thereof, said slider having a diameter substantially equal to the width of said slot.

5. A machine according to claim 1, wherein the fourth unit, co-operating with the first revolving table includes a shaped movable supporting wall provided with means adapted to move said wall forwardly to support the annular hollow member carried by a pliers unit of the second revolving table, when this latter has been stopped in the front of said second station associated with this second revolving table, in alignment with the fourth unit of the first revolving table and to cause the trailing end of this slider to enter the side slot of the respective annular hollow member.

6. A machine according to claim 1, wherein the first unit associated with the second revolving table comprises a container provided with a guiding rod supporting a plurality of annular hollow members superposed in column and so positioned as to have all their cut sectors in perfect vertical alignment and their slots placed on the sides of the hollow members opposite to those facing the second revolving table, near the bottom of this container a slide distributor being provided adapted to engage the annular member which falls down into the container under the control of a dispenser and to push it forwards up to bring it between the open pliers arms of the pliers unit which has been stopped in the front of this first station.

7. A machine according to claim 1, wherein the third unit co-operating with the second revolving table includes a movable shaped member adapted to push the already partially introduced slider so as to furtherly enter inside the annular member.

8. A machine according to claim 1, wherein the fourth unit associated with the second revolving table includes a reciprocating pusher and means adapted to complete the introduction of the slider inside the respective annular hollow member, and means adapted to collect each finished safety catch, yet lacking the spring, so as to convey it towards an associated successive machine adapted to perform the automatic introduction of a helical spring inside the hollow member and positions behind the slider already introduced therein.

* * * * *